US008738945B2

(12) United States Patent
Reed

(10) Patent No.: US 8,738,945 B2
(45) Date of Patent: *May 27, 2014

(54) USING NON-LOSSLESS COMPRESSION TO SAVE POWER

(75) Inventor: David G. Reed, Saratoga, CA (US)

(73) Assignee: NVIDIA Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/069,387

(22) Filed: Mar. 23, 2011

(65) Prior Publication Data

US 2011/0173476 A1 Jul. 14, 2011

Related U.S. Application Data

(63) Continuation of application No. 11/301,850, filed on Dec. 12, 2005, now Pat. No. 7,925,907.

(51) Int. Cl.
G06F 1/32 (2006.01)

(52) U.S. Cl.
USPC ............................ 713/320; 713/300; 713/323

(58) Field of Classification Search
USPC .......................... 713/300, 310, 320, 323, 324
See application file for complete search history.

(56) References Cited

U.S. PATENT DOCUMENTS

| 5,961,617 | A | 10/1999 | Tsang |
| 6,266,776 | B1 | 7/2001 | Sakai |
| 6,971,034 | B2 | 11/2005 | Samson et al. |
| 6,992,675 | B2 | 1/2006 | Aleksic et al. |
| 7,036,032 | B2 | 4/2006 | Mizuyabu et al. |
| 7,159,128 | B2 | 1/2007 | Lyons |
| 7,925,907 | B1 * | 4/2011 | Reed ............................ 713/320 |
| 2002/0063716 | A1 | 5/2002 | Osborn et al. |
| 2003/0201990 | A1 | 10/2003 | Aldrich et al. |
| 2004/0155854 | A1 | 8/2004 | Ma et al. |
| 2004/0199798 | A1 | 10/2004 | Whelan et al. |
| 2005/0068311 | A1 | 3/2005 | Fletcher et al. |
| 2006/0101293 | A1 | 5/2006 | Chandley et al. |

* cited by examiner

Primary Examiner — Paul Yanchus, III
(74) Attorney, Agent, or Firm — Kilpatrick Townsend & Stockton LLP

(57) ABSTRACT

Circuits, methods, and systems that reduce or eliminate the number of data transfers between a system memory and a graphics processor under certain conditions. After inactivity by a user of an electronic device is detected, the color fidelity of pixels being displayed is reduced. Color fidelity can be reduced by compressing pixel values, and the compression may be non-lossless, for example, pixel data bits may be truncated. The degree of compression can be progressively increased for longer durations of inactivity, and this progression may be limited by a threshold. Inactivity may be detected by a lack of input from devices such as a keyboard, pen, mouse, or other input device. Once activity is resumed, uncompressed pixel data, or pixel data that is compressed in a lossless manner, is displayed.

20 Claims, 13 Drawing Sheets

USING NON-LOSSLESS COMPRESSION TO SAVE POWER

CROSS-REFERENCES TO RELATED APPLICATIONS

This application is a continuation of U.S. application Ser. No. 11/301,850, filed Dec. 12, 2005, titled "Using Non-Lossless Compression to Save Power," which is incorporated by reference.

BACKGROUND

The present invention relates generally to saving power in portable graphics systems, and more particularly to using non-lossless compression to save power in portable graphics systems.

The number and type of portable, battery-powered electronic devices has proliferated the last few years with the increasing popularity of laptop computers, personal digital assistants, cell phones, and the like. Others, such as portable book readers (e-books), gaming, and video systems are set to become ubiquitous in the near future. These devices save time, increase efficiency, and provide entertainment.

But these devices have a dark side. Their batteries are in constant need of recharging. Accordingly, it is very desirable to reduce the power consumed by these battery-powered electronic devices, since any reduction in power lengthens the time before recharging is required.

In some devices, such as laptop, notebook, or tablet computers, much of the power dissipation occurs in the graphics system including the graphics processor, frame buffer memory, and display. Data transfers between the graphics processor and its frame buffer memory are the cause some of this power dissipation.

In some portable laptop computer architectures, data is transferred between a frame buffer memory located in a system memory and a graphics processing unit (GPU) located in an integrated graphics processor (IGP). This path includes two buses: a memory bus connecting the system memory to a central processing unit (CPU) and a host bus connecting the central processing unit to the integrated graphics processor. Output circuits that transmit data over these buses must drive integrated circuit pin capacitance, bus trace capacitance, and other stray capacitances. Driving the capacitances of these buses consumes a substantial amount of power. Also, each time data is transferred, the central processing unit, if it is not otherwise occupied, has to wake from a reduced power state to perform the data transfer.

Thus, what is needed are circuits, methods, and apparatus that reduce the number of data transfers that take place between a system memory and a graphics processor.

SUMMARY

Accordingly, embodiments of the present invention provide circuits, methods, and systems that reduce or eliminate the number of data transfers between a system memory and a graphics processor under certain conditions. One exemplary embodiment of the present invention detects inactivity by a user of an electronic device. Following this detection, the color fidelity of pixels being displayed is reduced. Color fidelity can be reduced by compressing the displayed pixels. The compression may be non-lossless, for example, the bits of the pixel data may be truncated, or other lossy compression may be used. The degree of compression may be variable, that is, it may be progressively increased for longer durations of inactivity. This progression may be limited by the use of a threshold value, beyond which data is not compressed. In other embodiments, once data is compressed to where it fits in an on-chip memory, no further compression is performed. Once activity is resumed, uncompressed pixel data, or pixel data that is compressed in a lossless manner (or compressed with fewer losses), can be displayed.

Inactivity may be detected by a lack of input from devices such as a keyboard, pen, mouse, or other input device for a certain duration. Instead of being time-based, inactivity or inattentiveness may be detected by analyzing a user's head or eye position. Inactivity may be detected after a duration that is dependent on the type or specific application being run on the electronic device. For example, an interactive program such as a word processing application may use a shorter duration, while a less interactive application, such as an e-book, may use a longer duration.

The integrated graphics processing unit includes a memory that is large enough to hold a portion of the pixels needed for one frame of an image. In one exemplary embodiment, a few lines of pixel data can be stored in this memory. Each time these lines are displayed, more lines of data are retrieved from the frame buffer. When a sufficient period of inactivity is determined, the pixel data is compressed. By compressing this data, a greater number of lines of pixel data can be stored in the graphics processing unit's memory, reducing the frequency of line retrieval from the system memory, thereby reducing power dissipation.

In another exemplary embodiment of the present invention, a memory included on the graphics processing unit is large enough to store an entire frame of compressed pixel data. After a sufficient period of inactivity is detected, pixels are compressed and stored in the memory. At this point, the integrated graphics processor does not require access to the system memory. Also, if the central processing unit is not otherwise occupied, its power supply voltage may be lowered, thereby reducing its power dissipation and leakage current.

Various electronic devices are improved by the incorporation of embodiments of the present invention. These devices include portable, battery-powered devices, such as a laptop, notebook, or tablet computers, personal digital assistants, cell phones, e-books, or email devices. Various embodiments of the present invention may incorporate one or more of these of the other features described herein.

One exemplary embodiment of the present invention provides a method of reducing power dissipation by compressing pixel data. This method includes monitoring user activity, and if a first duration passes without user activity, then compressing a plurality of pixels using a first algorithm and displaying the compressed pixels. Otherwise, the plurality of pixels is not compressed using the first algorithm.

Another exemplary embodiment of the present invention provides an integrated circuit. This integrated circuit includes a graphics processing unit and a memory configured to store compressed pixel data and coupled to the graphics processing unit. The GPU further includes a first circuit configured to detect user activity and a second circuit configured to compress pixel data. When the first circuit detects user inactivity for a first duration, the second circuit compresses pixel data using a first algorithm.

Yet another exemplary embodiment of the present invention provides another method of reducing power dissipation by compressing pixel data. This method includes detecting a user's inactivity, receiving a first plurality of pixel values from a first memory, compressing the pixel values, storing the compressed pixel values in the first memory, receiving the compressed pixel values from the first memory, storing the compressed pixel values in a second memory, and displaying the compressed pixel values.

A better understanding of the nature and advantages of the present invention may be gained with reference to the following detailed description and the accompanying drawings.

DESCRIPTION OF EXEMPLARY EMBODIMENTS

Figure 1:
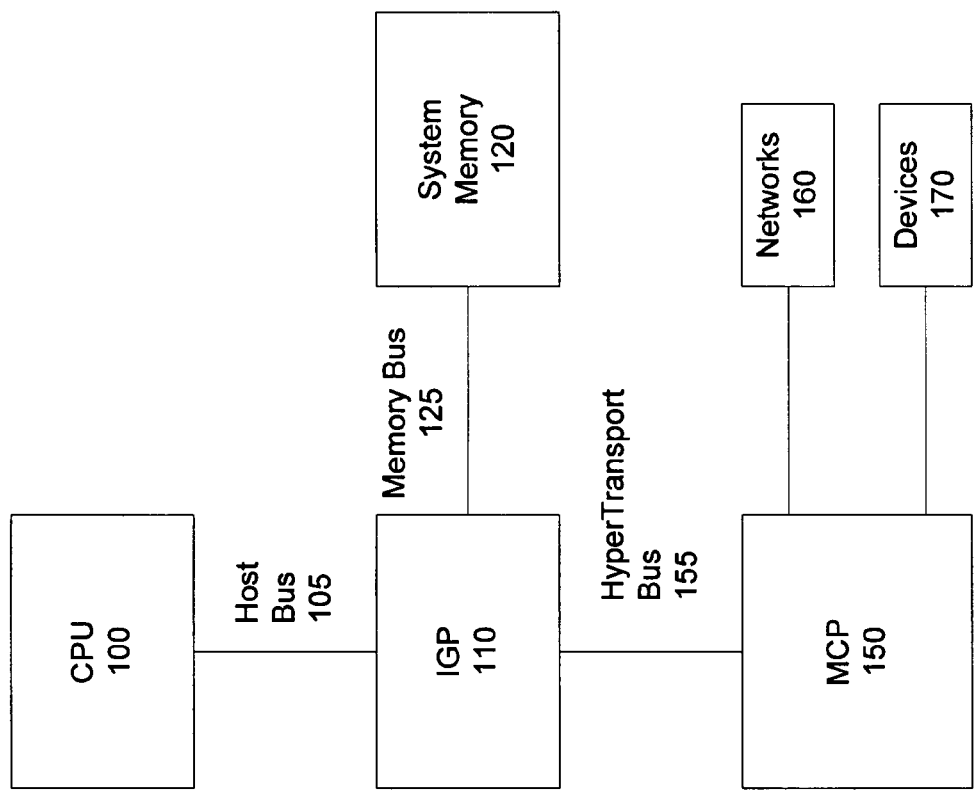
FIG. 1 is a block diagram of a computer system that is improved by the incorporation of an embodiment of the present invention.

FIG. 1 is a block diagram of a computer system that is improved by the incorporation of an embodiment of the present invention. This block diagram includes a central processing unit (CPU) or host processor 100, integrated graphics processor (IGP) 110, system memory 120, media communications processor (MCP) 150, networks 160, and internal and peripheral devices 170. This figure, as with the other included figures, is shown for illustrative purposes only, and does not limit either the possible embodiments of the present invention or the claims.

The CPU 100 connects to the IGP 110 over the host bus 105. The IGP 110 includes a graphics processing unit (GPU) (not shown), which generates graphic and video images for display over a monitor or other display device (not shown). The graphics processing unit stores pixel data for these images, as well as other graphics data in the system memory 120 using the memory bus 125. The MCP 150 communicates with the IGP 110 via a high-speed connection such as a HyperTransport bus 155, and connects network 160 and internal and peripheral devices 170 to the remainder of the computer system.

The CPU 100 may be a processor, such as those manufactured by Intel Corporation, Advanced Micro Devices, or other supplier, and are well-known by those skilled in the art. The IGP 110 and MCP 150 are commonly referred to as a chipset, each being a chipset integrated circuit. The memory 140 is often a number of dynamic random access memory devices arranged in a number of the dual in-line memory modules (DIMMs). The integrated graphics processor 110 and MCP 150 are preferably manufactured by NVIDIA Corporation of Santa Clara, Calif.

In other systems that are improved by the incorporation of embodiments of the present invention, the graphics processing unit may be a separate device from the IGP 110 (which may be replaced by a system platform processor or SPP.) For example, the GPU may be located on a graphics card, while the CPU 100, system platform processor, system memory 120, and media communications processor 150 may be located on a computer system motherboard.

These systems may include more than one GPU. Additionally, each of these graphics processing units may be located on a motherboard or on a separate graphics card. Two or more of these graphics cards may be joined together by a jumper or other connection. One such technology, the pioneering SLI™, has been developed by NVIDIA Corporation of Santa Clara, Calif. In other embodiments of the present invention, one or more GPUs may be located on one or more graphics cards, while one or more others are located on the motherboard.

While this embodiment provides a specific type computer system that is improved by the incorporation of an embodiment of the present invention, other types of electronic or computer systems are also improved. For example, cell phones, e-books, portable game and video systems, and other types of systems are improved by the incorporation of embodiments of the present invention.

Also, while these types of computer systems, and the other electronic systems described herein, are presently commonplace, other types of computer and other electronic systems are currently being developed, and others will be developed in the future. It is expected that many of these will also be improved by the incorporation of embodiments of the present invention. Accordingly, the specific examples listed are explanatory in nature and do not limit either the possible embodiments of the present invention or the claims.

Figure 2:
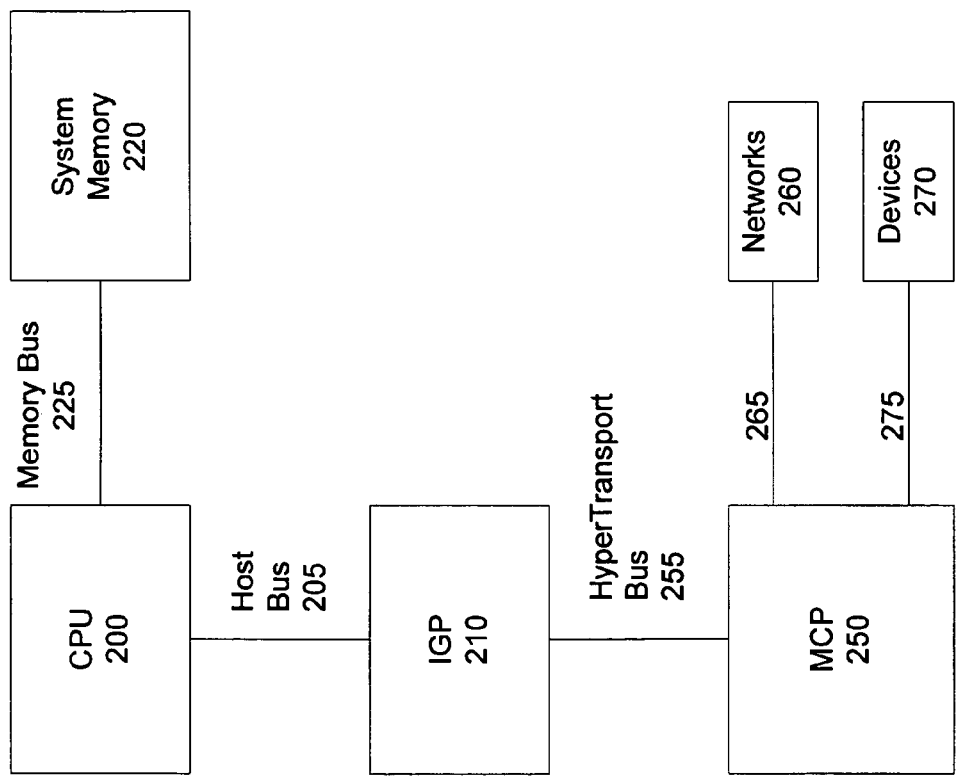
FIG. 2 is a block diagram of another computer system that is improved by the incorporation of an embodiment of the present invention.

FIG. 2 is a block diagram of another computing system that is improved by incorporating an embodiment of the present invention. This block diagram includes a CPU or host processor 200, integrated graphics processor (IGP) 210, system memory 220, MCP 250, networks 260, and internal and peripheral devices 270.

The CPU 200 connects to the IGP 210 over the host bus 205 and to the system memory 220 over a memory bus 225. The IGP 210 and MCP 250 communicate over a high-speed bus such as a HyperTransport bus 255. The MCP 250 connects networks 260 and internal and peripheral devices 270 to the remainder of the computer system. Examples of networks 260 include Ethernet, USB, and wireless networks. Examples of devices 270 include hard disk drives, optical drives, printers, and other devices.

The CPU 200 may be a processor, such as those manufactured by Intel Corporation, Advanced Micro Devices, or other supplier, and are well-known by those skilled in the art. The IGP 210 and MCP 250 are commonly referred to as a chipset. The IGP 210 includes a graphics processor that receives data from the CPU over the host bus and generates graphic and video images for display over a monitor or other display device (not shown). The IGP 210 and MCP 250 are preferably devices manufactured by NVIDIA Corporation of Santa Clara, Calif.

The system memory 220 is often a number of dynamic random access memory devices arranged in a number of the dual in-line memory modules (DIMMs). The graphics processing unit included on the IGP 210 makes use the system memory 220: typically a portion of the system memory 220 is used as a frame buffer for the graphics processor.

The graphics processing unit (not shown) included in the integrated graphics processor 210 reads and writes data over the host bus 205 and memory bus 225. That is, to read data from the system memory 220, the graphics processor first makes a request to the CPU 200. The CPU 200 retrieves the requested data over the system memory bus 225 from the system memory 220. The CPU 200 then passes the data to the IGP 210, where it is received by the graphics processing unit. Thus, each time data is transferred from the system memory 220 to the IGP 210, two distinct data transactions over two separate buses occur. Accordingly, each data transfer requires the expenditure of power. The activities performed by the CPU during such a transfer are shown in the next figure.

Figure 3:
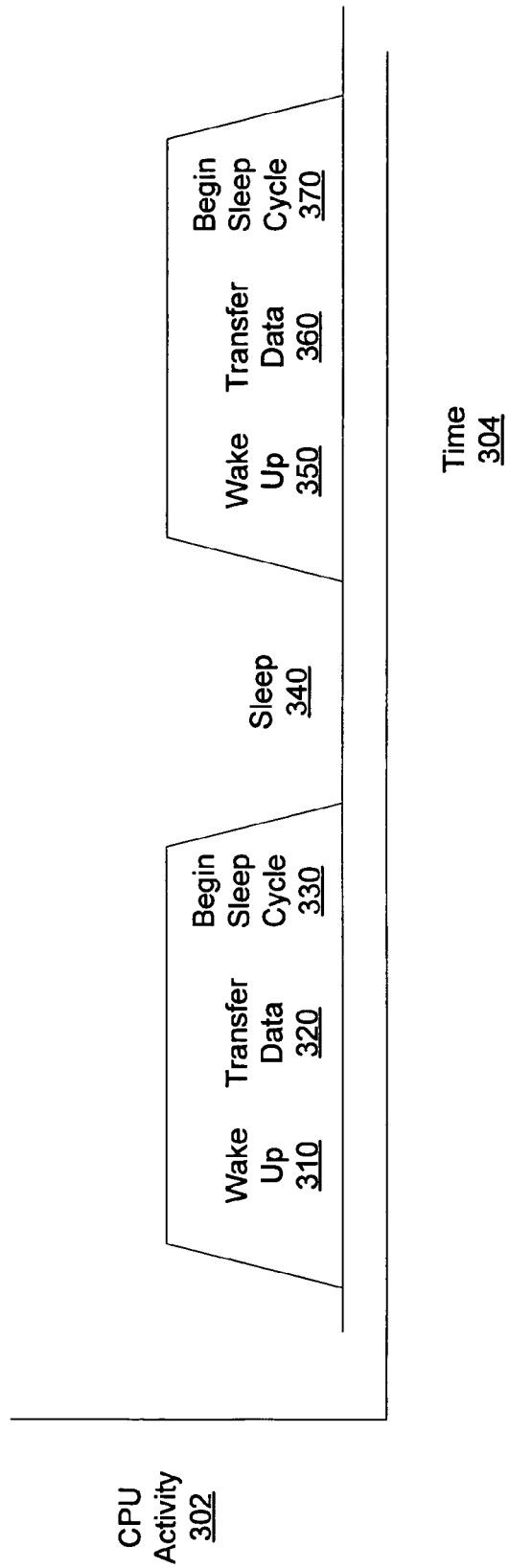
FIG. 3 is a timing diagram showing CPU activity during a data transfer between a system memory and a GPU.

FIG. 3 is a timing diagram showing central processing unit activity during a data transfer between a system memory and a graphics processing unit in the system of FIG. 2. Activities performed by a central processing unit are plotted as a function of time along an X-axis 304. In this figure, periods of sleep are broken by periods of data transfer related activities.

Initially, the graphics processing unit sends a request for data to the central processing unit. The central processing unit receives the request for data and wakes up 310. The central processing unit then transfers data 320 from the system memory to the graphics processing unit. Once the data transfer is complete, the central processing unit, if not engaged in other activities, begins a sleep cycle 330. The central processing unit enters a lower power dissipation state, or sleep cycle 340. During this time, the graphics processing unit displays the data transferred by the central processing unit.

At some point, the graphics processing unit requires more data. Accordingly, it sends another request for data to the central processing unit. The central processing unit again wakes up 350. The central processing unit then transfers data 360 from the system memory to the graphics processing unit, and afterwards can begin another sleep cycle 370.

As can be seen, for each transfer of data 320 or 360, the central processing unit is required to wake up and re-enter the sleep state: each of these transitions requiring power. Since each data transfer cycle requires the CPU to wake up and re-enter the sleep state, having fewer data transfers reduces this overhead. Accordingly, it is very desirable to limit the number of data transfers between the system memory and the graphics processing unit.

In one embodiment of the present invention, a graphics processing unit includes a memory. This memory may be configured as a first-in first-out memory (FIFO). The graphics processing unit may be included on an integrated graphics processor, or it may be a stand-alone device. Data transferred from the system memory to the graphics processing unit is stored in this memory. A sufficiently large memory could store an entire frame of data. However, the cost of such a memory is currently prohibitive. This is largely due to the fact that the DRAM technology used in the manufacture of a system memory is not compatible with process technologies used in the manufacture of graphics processing units.

Instead of making this memory larger, embodiments of the present invention reduce the size of the pixel data, such that data for more pixels can be stored in the memory at a given time, thereby reducing the number of data transfers between the system memory and the graphics processing unit.

Specifically, during periods of inactivity or inattentiveness by a user, color fidelity is reduced by compressing pixel data. This inactivity or inattentiveness can be determined by monitoring usage of a keyboard, mouse, pen, or other input device. The period of inactivity can be dependent on the application being run on the electronic device. For example, for highly interactive applications, such as word processing, the duration can be short. For less interactive applications, such as e-book readers, the duration can be shorter. Also, a user can provide the activity indirectly by running an application such as a DVD or MP3 decoder: it is undesirable that color fidelity be reduced while a movie is being watched.

In other embodiments, a duration of time is not the triggering mechanism for pixel data compression. For example, a user's hand, head, or eye location or direction can be monitored. For example, if the user is looking away, color fidelity can be reduced.

This compression can be lossless or non-lossless, for example, the bits of pixel data values can be truncated. In a specific embodiment of the present invention, the red, green, and blue color components are each nominally 8 bits, but are truncated to 4, 5, and 4 bits respectively. Alternately, each color component can be reduced to three bits in size. In other embodiments of the present invention, the original size of the pixels values can be different than eight, and different levels of truncation can be used. In various embodiments, the compression can become more severe the longer the period of inactivity or inattentiveness. Once activity is detected, the pixel data is no longer compressed, or it is compressed in a lossless (or non-lossless to a lesser degree) manner.

By compressing pixel data, more lines of pixel data can be stored in the memory, resulting in a fewer number of wake-ups and return to sleep cycles. If an entire frame can be stored in the memory, data transfers from the system memory can be eliminated for the remainder of the period of inattentiveness.

In this case, the power supply for the central processing unit can be reduced. This has a doubly beneficial effect. The power supply dissipated by the central processing unit is the product of its power supply voltage and its supply current. Therefore, reducing power supply voltage reduces the power dissipation. Also, the leakage current component of the supply current tracks the power supply voltage. Accordingly, the leakage current, and therefore the supply current, is reduced when the power supply voltage is lowered. This further reduces the central processing unit's power dissipation.

Also, during a period of inactivity by a user, the activity level of the IGP and related devices is low. Accordingly the power supplies for these devices can be reduced. Circuits, methods, and apparatus that can be used to reduce these power supplies can be found in copending U.S. patent application Ser. No. 11/689,440 titled Variable Voltage Regulation Integrated in a Mobile System Chipset, by Solanki et al., which is incorporated by reference.

Figure 4:
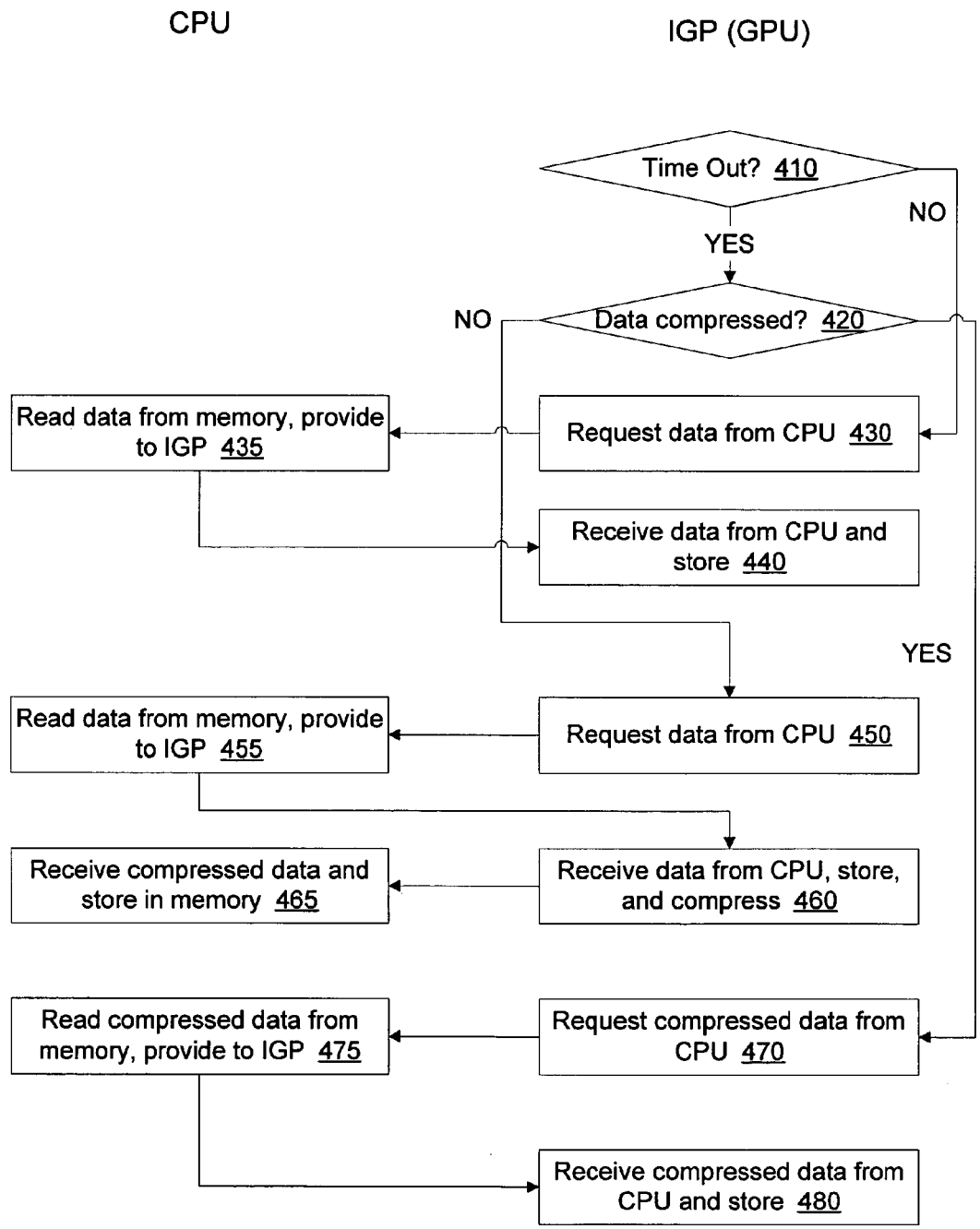
FIG. 4 is a flowchart of a method of reducing a number of data transfers between a system memory and a GPU according to an embodiment of the present invention.

FIG. 4 is a flowchart of a method of reducing a number of data transfers between a system memory and a GPU according to an embodiment of the present invention. In this flowchart, once a period of inactivity or inattentiveness has been detected, pixel data is compressed and stored in the system memory. Once an entire frame of pixel data is compressed and stored in the system memory, the compressed data is retrieved from system memory and displayed.

Specifically, in act 410, it is determined whether a duration has transpired without activity by a user. If the duration has not yet transpired, when the IGP needs new data, it requests data from the CPU in act 430. The central processing unit reads data from the system memory and provides it to the IGP in act 435. In act 440, the IGP receives data from the central processing unit and stores it. This data can then be displayed.

Once the duration has transpired without user activity taking place, it is determined whether the current pixel data is stored in compressed form in memory. If it is not, when the IGP needs data, it requests data from the CPU in act 450. In act 455, the CPU reads data from the system memory and provides it to the IGP. The IGP receives data from the central processing unit, stores it, and compresses it in act 460. In act 465, the compressed data is sent back to the central processing unit where it is stored in the frame buffer memory.

Once the frame of pixel data is compressed and stored in the frame buffer memory, the integrated graphics processor can again request data from the CPU in act 470. At this point, the compressed data is read from the system memory and provided by the CPU to the IGP in act 475. In act 480, compressed data is received and stored. This compressed data can then be displayed. In various embodiments of the present invention, the degree or severity of compression can be increased for longer durations of user inactivity or inattentiveness. For example, more bits of pixel data values can be truncated.

Figure 5A:
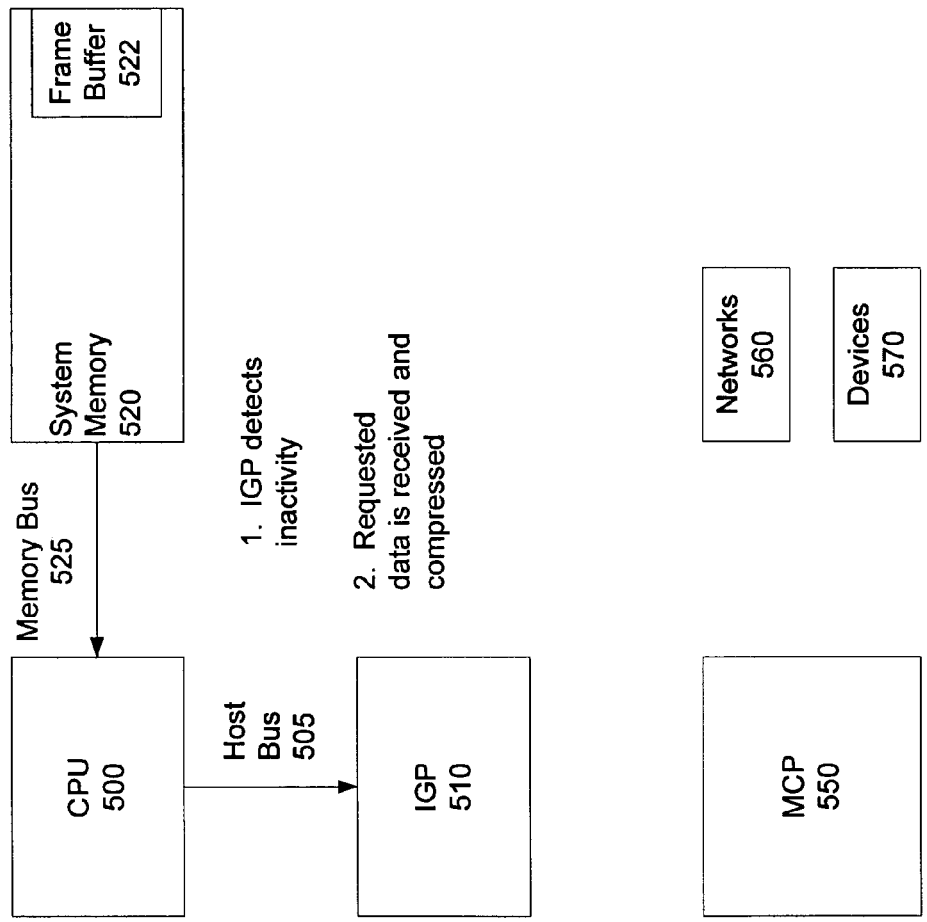
FIGS. 5A-5C illustrate data transfers between the system memory and IGP in the computer system of FIG. 2 according to an embodiment of the present invention.
Figure 5B:
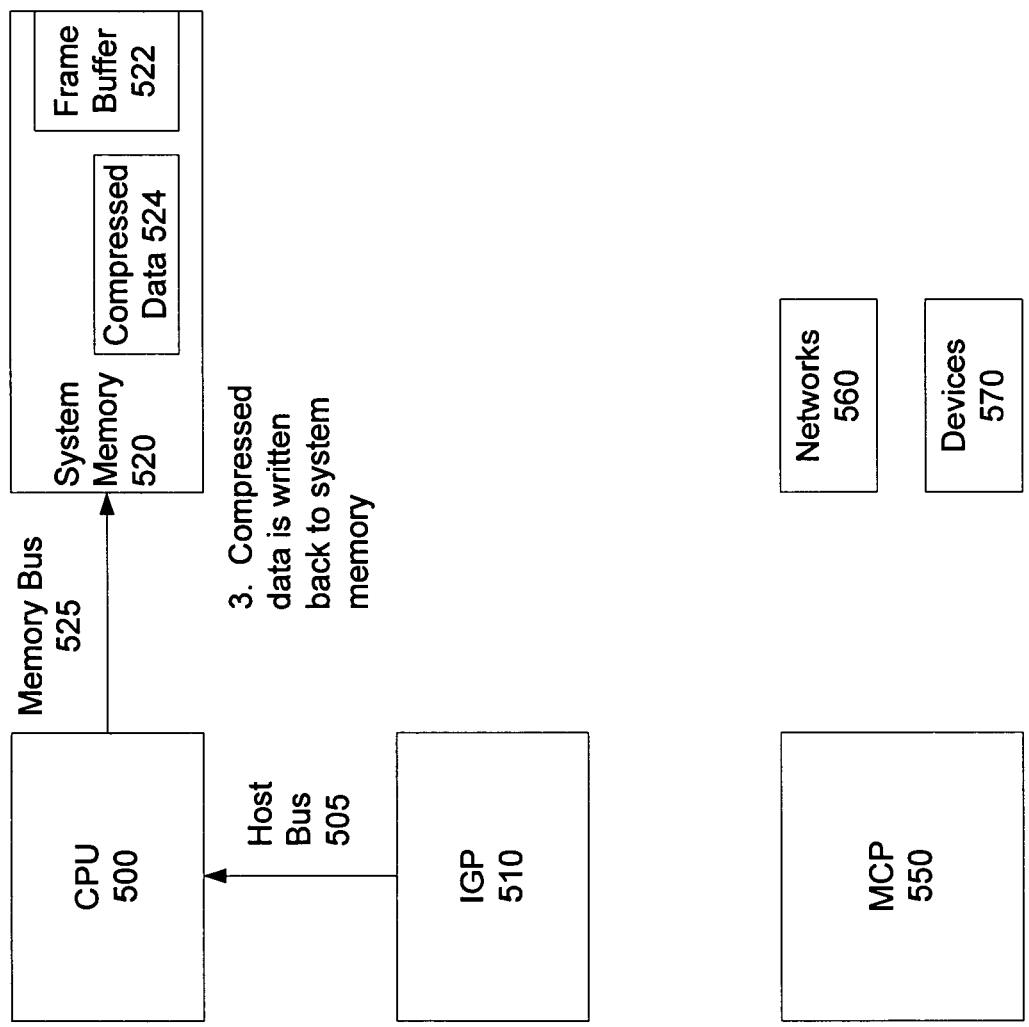
Figure 5C:
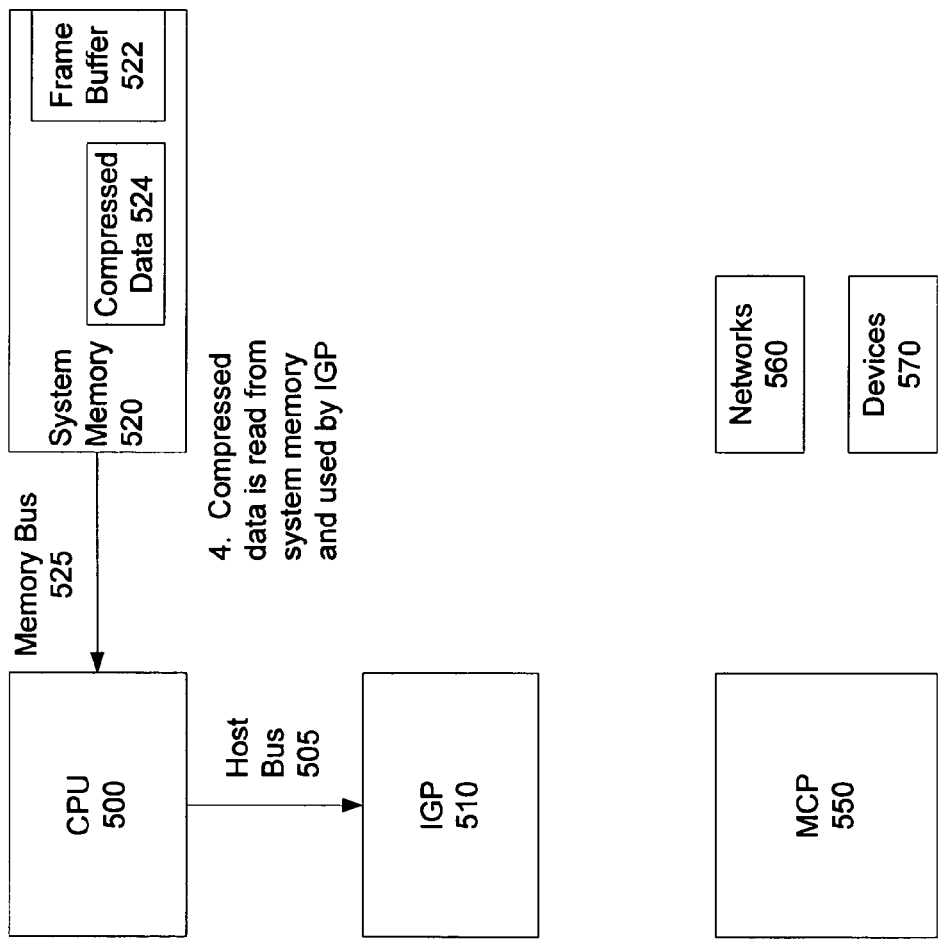

FIGS. 5A-5C illustrate data transfers between the system memory and IGP in the computer system of FIG. 2 according to an embodiment of the present invention. In FIG. 5A, the IGP detects that a period of inactivity or inattentiveness of sufficient duration has occurred. Following this, data requested from the frame buffer 522 by the IGP 510 is compressed.

In FIG. 5B, the compressed data is written back to the system memory and stored as compressed data 524. In FIG. 5C, the compressed data is read back from the system memory and stored in the IGP 510. This compressed data is then displayed. Circuits, methods, and apparatus that provide compression, and store and track compressed data in a system memory can be found in copending U.S. patent application Ser. No. 10/435,073, filed May 9, 2003, titled Screen Compression, by Danskin et al., which is incorporated by reference.

Compressing data during a period of user inactivity or inattentiveness reduces the power needed to move data from a system memory to a graphics processing circuit. Further reduction is possible by compressing data to the point where it can all be stored in a memory on the graphics processing circuit.

In various embodiments of the present invention, the on-chip memory may be only large enough to store compressed data, while in others, both compressed data and some amount of uncompressed data can be stored. If only compressed data can be stored, data is received by the graphics processing circuit, compressed, and written back to system memory. Once all the necessary data is compressed in system memory, it can be received and stored in the on-chip memory. Such an embodiment of the present invention is shown in the next two figures. If the on-chip memory is somewhat larger, as lines of data are received, they can be compressed and stored in the on-chip memory. Such an embodiment of the present invention is shown below in FIG. 8.

Figure 6:
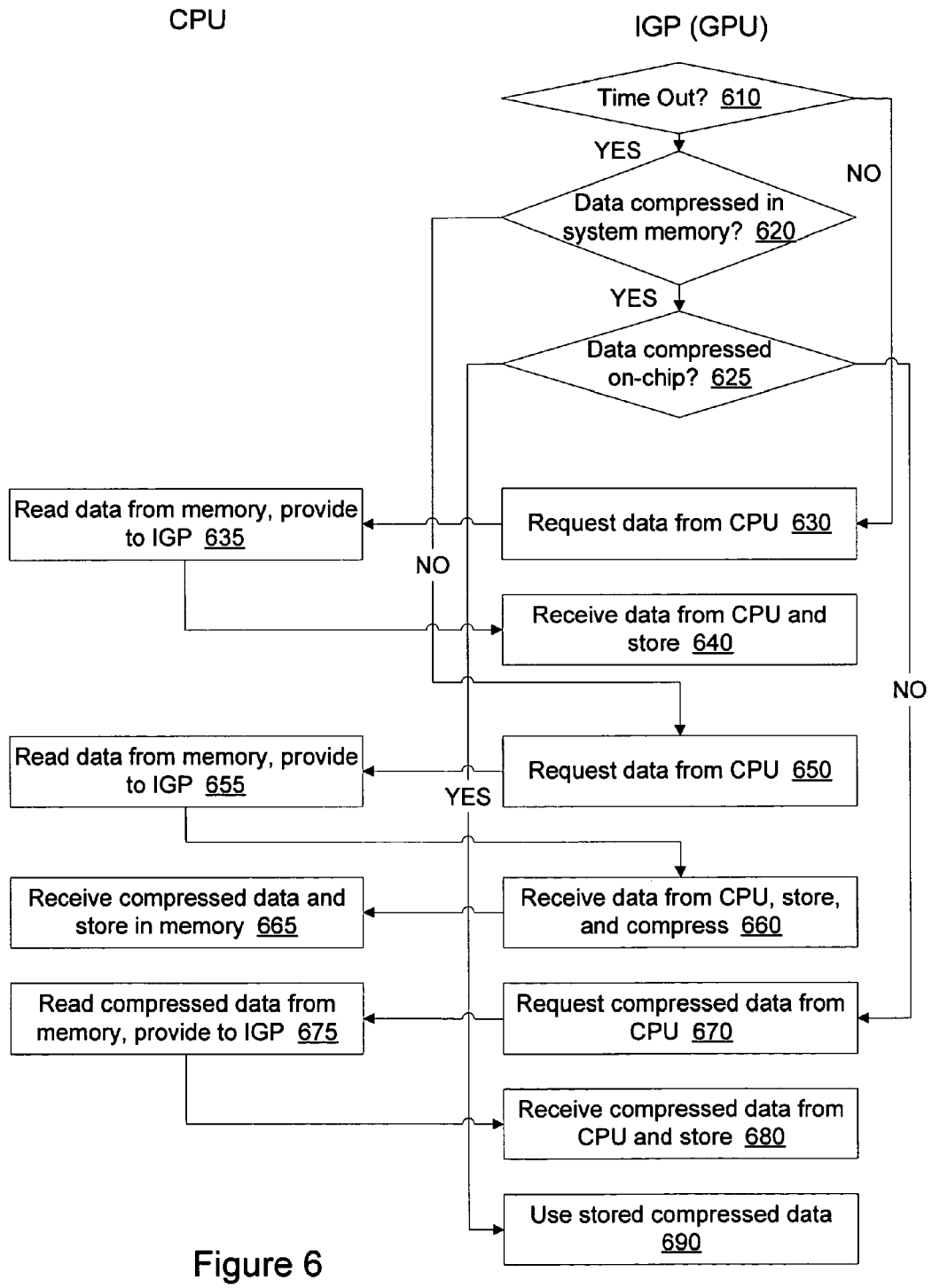
FIG. 6 is a flowchart of another method of reducing a number of data transfers between a system memory and a GPU according to an embodiment of the present invention.

FIG. 6 is a flowchart of another method of reducing a number of data transfers between a system memory and a GPU according to an embodiment of the present invention. In this method, the memory in the graphics processing unit is large enough to store an entire frame of compressed pixel data. This allows the graphics processing unit to use data stored in its own memory without having to access data from the system memory via the central processing unit.

Specifically, in act 610, it is determined whether a duration has expired without user activity being detected. If it has not, data is requested from the central processing unit by the graphics processing unit in act 630. In act 635, the central processing unit reads data from the system memory and provides it to be integrated graphics processor. In act 640, data is received from the central processing unit and stored in the graphics processing unit. This data can then be displayed.

Once the duration has transpired without user activity being detected, it is determined in act 620 whether the current pixel data is compressed in the system memory. If it is not, then data is requested from the central processing unit by the IGP in act 650. The central processing unit reads data and provides it to the integrated graphics processor in act 655. The integrated graphics processor receives data from the central processing unit, stores it, and compresses it in act 660. In act 665, the compressed data is sent by the IGP and received by the central processing unit, which stores it in the system memory.

If it is determined that the pixel data is compressed in the system memory in act 620, then it is determined whether the data is compressed in the graphics processor unit's memory in act 625. If it is not, then the integrated graphics processor requests compressed data from the central processing unit in act 670. In act 675, the central processing unit reads compressed data from the system memory and provides it to the integrated graphics processor in act 675. The integrated graphics processor receives the compressed data from the central processing unit and stores it in act 680. The compressed data can then be displayed.

At some point, all of the compressed data is received and stored in the integrated graphics processor. The integrated graphics processor can use this data in act 690. The integrated graphics processor does not require data transfers from the central processing unit for the remainder of the period of user inattentiveness. In various embodiments of the present invention, the power supply for the central processing unit, and possibly the system memory and other circuits, is reduced, thereby further saving power.

Figure 7A:
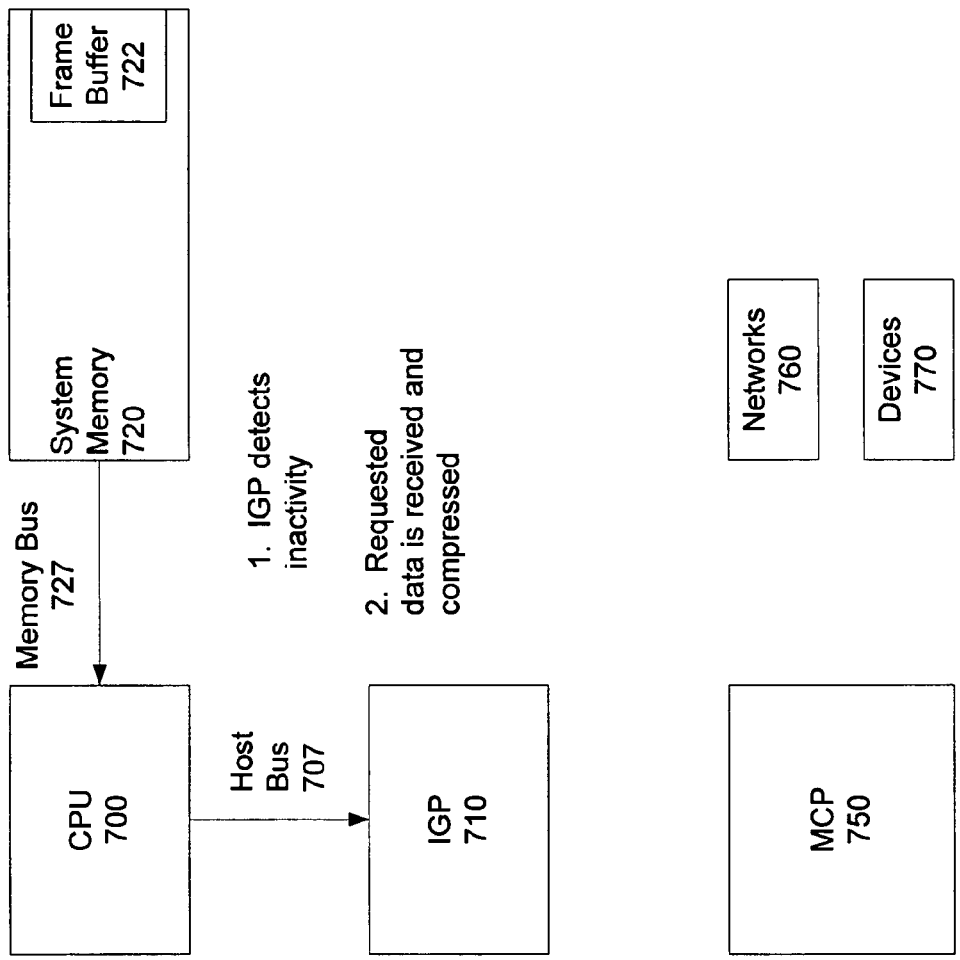
FIGS. 7A-7C illustrate data transfers between the system memory and IGP in the computer system of FIG. 2 according to another embodiment of the present invention.
Figure 7B:
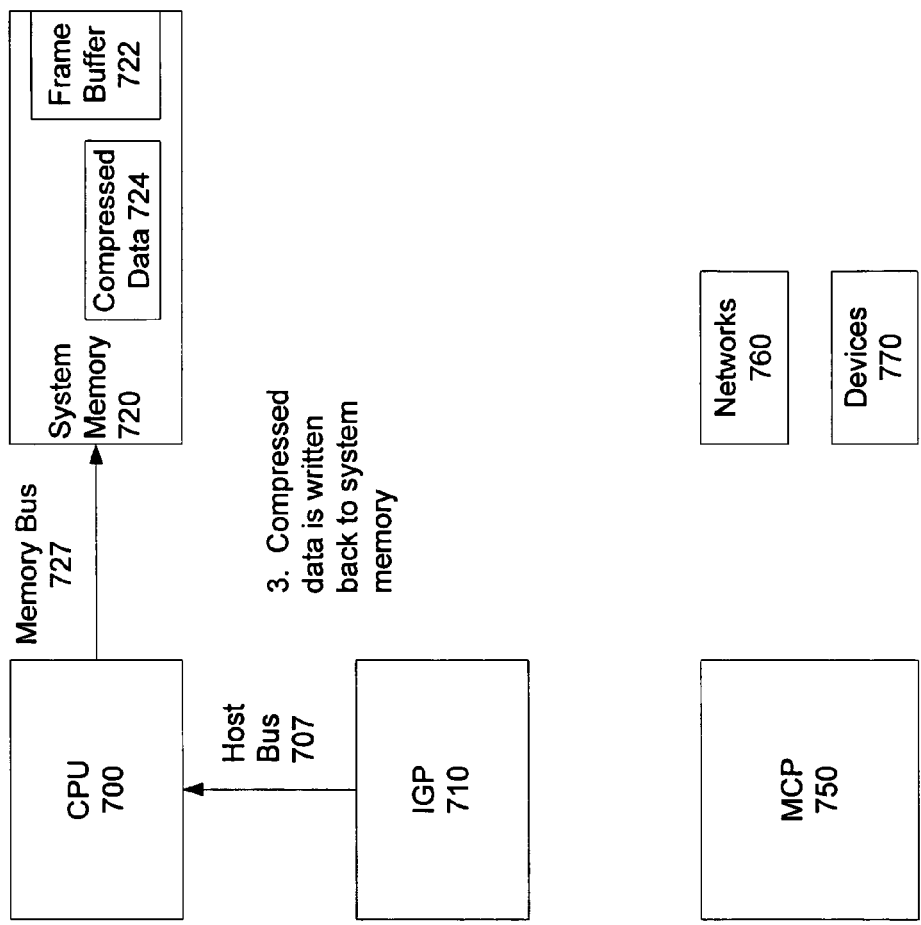
Figure 7C:
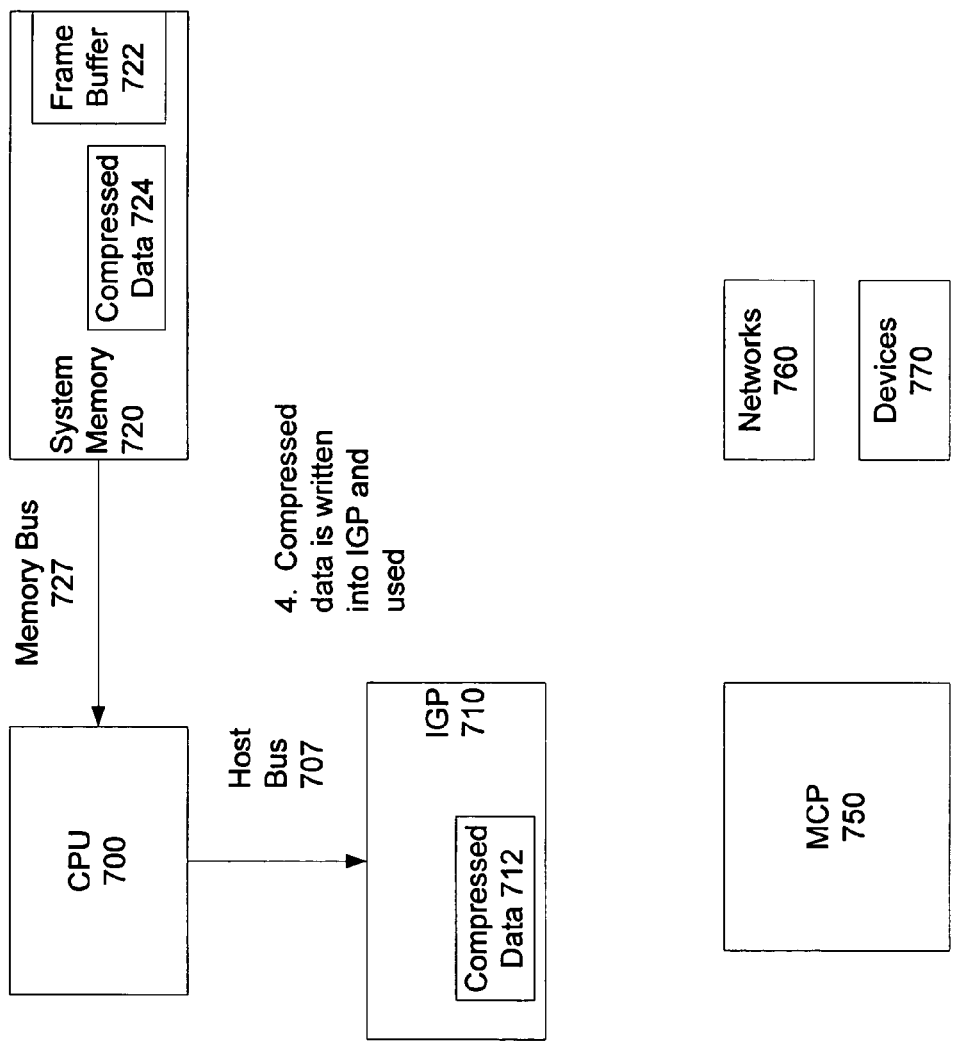

FIGS. 7A-7C illustrate data transfers between the system memory and IGP in the computer system of FIG. 2 according to another embodiment of the present invention. In FIG. 7A, the integrated graphics processor detects that a period of user inactivity or inattentiveness has reached a threshold. Further data requested from the frame buffer 722 is compressed by the integrated graphics processor 710.

In FIG. 7B, the compressed data is written back to the system memory and stored as compressed data 724. In FIG. 7C, the compressed data is written to the integrated graphics processor 710 and stored as compressed data 712. The compressed data is then displayed.

The particulars of the flowchart of FIG. 6 and data transfers of FIG. 7 may change depending on the size of the memory in the graphics processing unit. FIGS. 6 and 7 are illustrative of a situation in which the memory is not large enough to store a sufficient number of lines of uncompressed data simultaneously with a frame of compressed data. Accordingly, compressed data is first stored in the system memory. Once a frame is compressed and stored in the system memory, it is read back and stored in the graphics processing unit's memory.

In other embodiments of the present invention, the graphics processing unit's memory is large enough to store a sufficient amount of uncompressed data and a frame of compressed pixel data simultaneously. In that case, the compressed data does not need to be stored in the system memory. Rather, data is stored in the integrated graphics processor as it is compressed. This is shown in the following flowchart.

Figure 8:
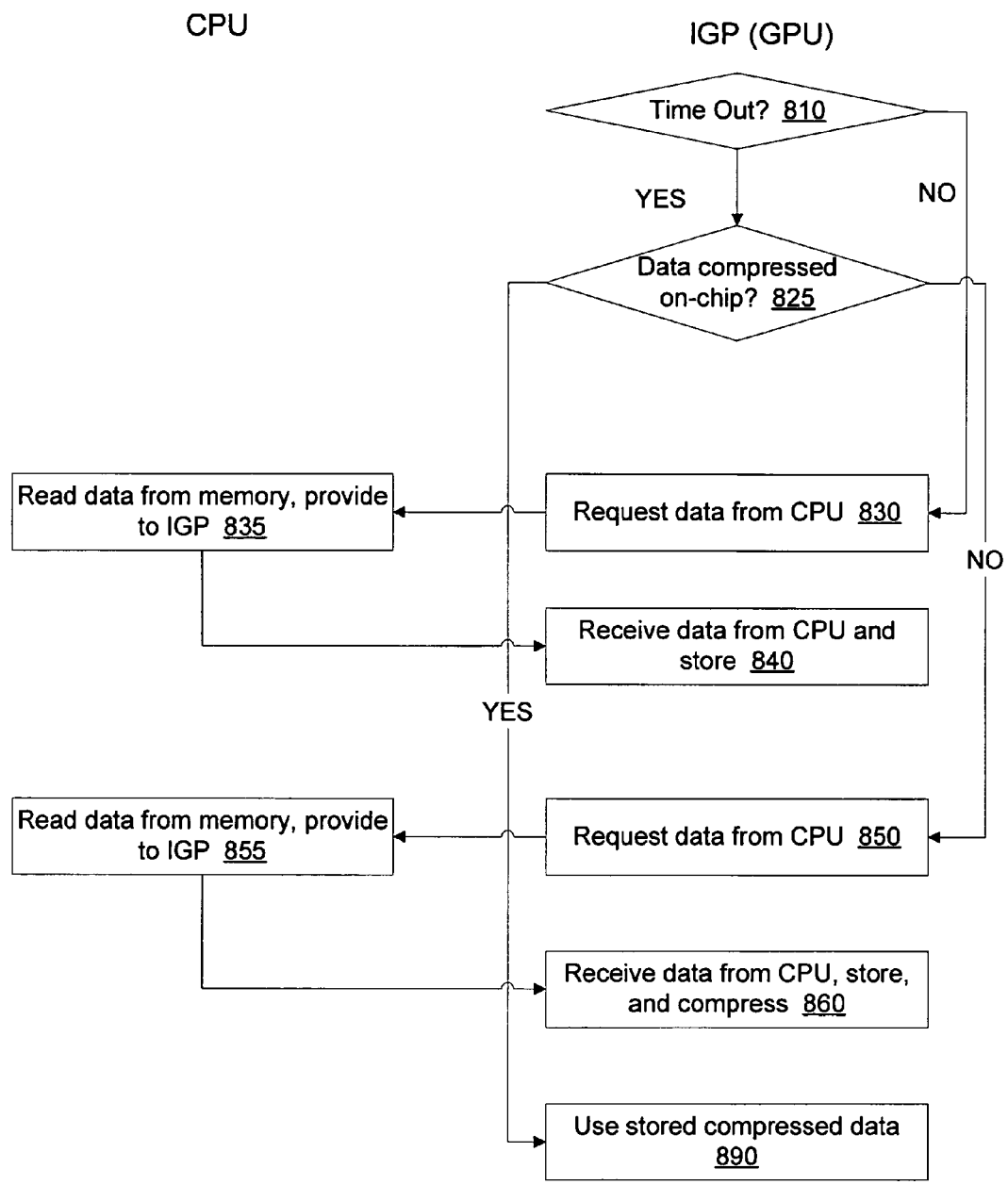
FIG. 8 is a flowchart of another method of reducing a number of data transfers between a system memory and a GPU according to an embodiment of the present invention.

FIG. 8 is a flowchart of another method of reducing a number of data transfers between a system memory and a GPU according to an embodiment of the present invention. In this embodiment, the memory in the graphics processing unit is large enough to store uncompressed pixel data as well as an entire frame of compressed pixel data.

Specifically, in act 810, it is determined whether a duration has expired without user activity being detected. If it has not, data is requested from the CPU by the IGP in act 830. Data is read from the system memory by the central processing unit and provided to the integrated graphics processor in act 835. The data is received and stored by the IGP in act 840. This data can then be displayed.

Once the duration has transpired without user activity being detected, it is determined in act 820 whether the current pixel data is compressed in the graphics processing unit's memory. If it is not, data is requested from the central processing unit by the IGP in act 870. Data is read from the system memory and provided to the IGP in act 875. In act 860, data is received from the central processing unit, stored, and compressed.

Once a frame of data is compressed and stored on the IGP, the compressed data can be used in act 890, and displayed for the remainder of the period of inactivity or inattentiveness.

Again, in various embodiments of the present invention, the level of compression may increase as the duration of user in inattentiveness or inactivity lengthens. The level of compression may increase until color fidelity reaches a point that all compressed data may be stored in an on-chip memory. In various embodiments of the present invention, a compression threshold may be set, where that data is not compressed beyond the threshold. An example of such an embodiment is shown in the following figure.

Figure 9:
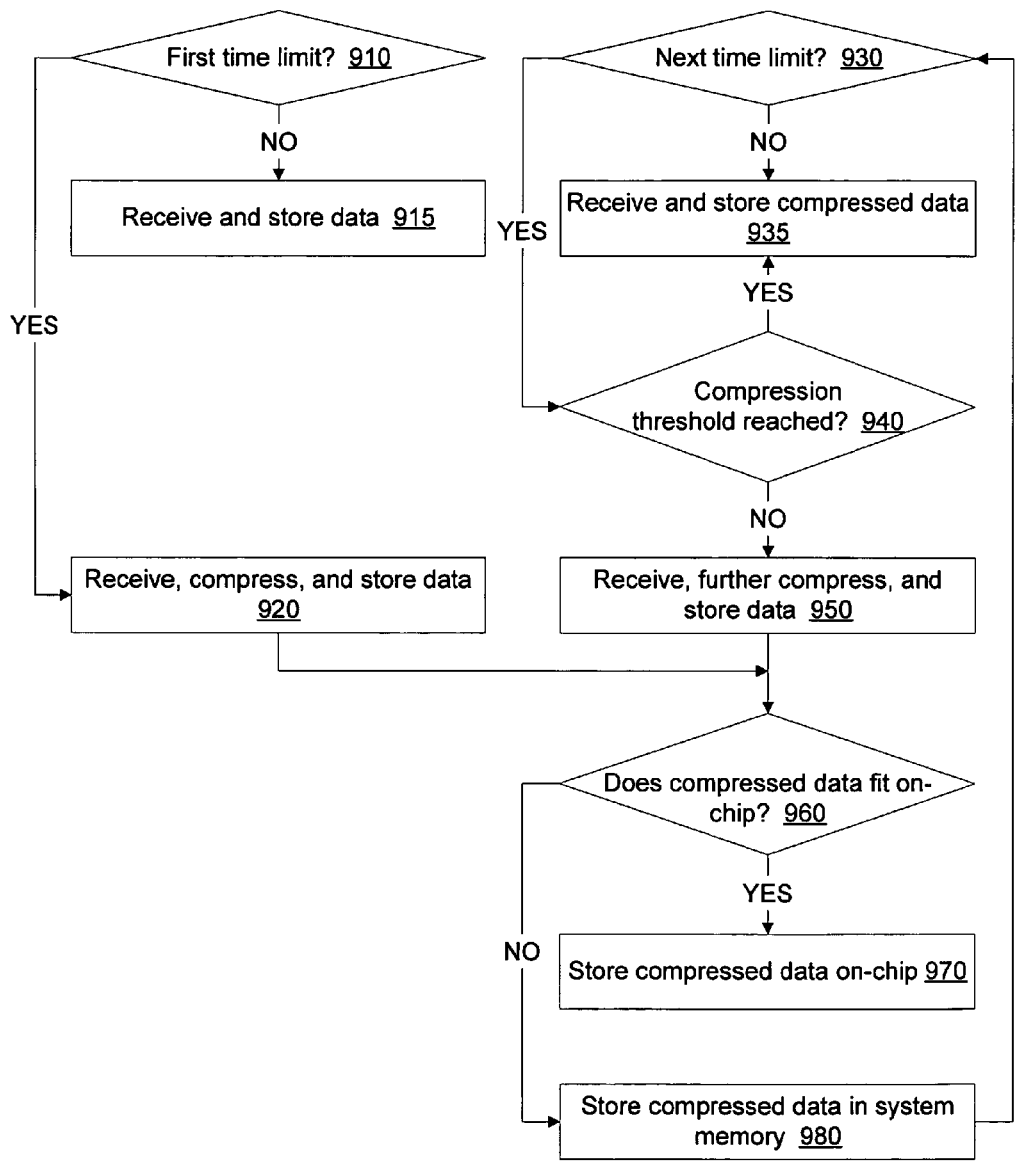
FIG. 9 is a flowchart illustrating a method of compressing data consistent with an embodiment of the present invention.

FIG. 9 is a flowchart illustrating a method of compressing data consistent with an embodiment of the present invention. In this figure, data is compressed until either a threshold is reached, or the data is compressed to the point that it can be stored in an on chip memory. Again, storing all data on chip save the power required to move data from a system memory to a graphics processing circuit. In this figure, the acts are performed by a graphics processing circuit such as a graphics processing unit or integrated graphics processor.

Specifically, in act 910, it is determined whether a user has been inattentive or inactive for a first duration. If not, data can be received from the CPU, stored, and displayed in act 915. If the threshold has been reached, data can be received, compressed, stored, and displayed in act 920.

In act 960, it is determined whether the compressed data fits on chip. If it does, data is stored on chip and the sequence of events is complete. If the compressed data does not fit on chip in act 960 however, some or all of the compressed data is stored in system memory in act 980.

In act 930, it is determined whether the next threshold or duration of inactivity or inattentiveness has been reached. If it has not, the compressed data can be received and stored in act 935. If the next threshold of inattentiveness or inactivity has been reached, it can be determined whether the data has been compressed beyond a threshold. This threshold may be set by a system BIOS, by software such as a driver, or by other means. If the threshold level of data compression has reached the threshold, no further compression is done, and the compressed data may be received, stored, and displayed in act 935.

If the compression threshold has not been reached in act 940, data it may be received, compressed further, and stored in act 950. In various embodiments, the original uncompressed data it may be received and compressed, or previously compressed data may be received and further compressed.

As before, in act 960, it is determined whether the compressed data can be stored on-chip. As before, if it can be, the compressed data is stored on-chip in act 970. If the compressed data still does not fit in the on-chip memory, some or all of the compressed data can be stored in system memory in act 980. Whenever the user returns, uncompressed data is used.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of reducing power dissipation comprising:
  with a graphics processor:
  monitoring user activity;
  if a first duration passes without user activity occurring, then
  reading a plurality of pixels from an external memory;
  reducing a color fidelity of the plurality of pixels;
  storing the plurality of pixels having the reduced color fidelity in the external memory; and
  displaying the plurality of pixels having the reduced color fidelity; then
  reading the plurality of pixels having the reduced color fidelity from the external memory; and
  displaying the plurality of pixels having the reduced color fidelity; and
  if a second duration passes without user activity, the second duration longer than the first duration, then
  further reducing the color fidelity of the plurality of pixels;
  storing the plurality of pixels having the further reduced color fidelity in a memory on the graphics processor; and
  displaying the plurality of pixels having the further reduced color fidelity; otherwise,
  not reducing the color fidelity of the plurality of pixels; and
  displaying the plurality of pixels.

2. The method of claim 1 wherein the color fidelity of the plurality of pixels is reduced using a non-lossless compression algorithm.

3. The method of claim 1 wherein the color fidelity of the plurality of pixels is reduced by truncating a value of each of the plurality of pixels.

4. The method of claim 1 further comprising:
  if a second duration passes without user activity, the second duration longer than the first duration; then
  reducing a power supply for a central processing unit.

5. An integrated circuit comprising:
  a graphics processing unit comprising:
    a first circuit configured to detect user activity;
    a second circuit configured to compress pixel data; and
    an internal memory to store compressed data; and
  an external memory configured to store compressed pixel data and coupled to the graphics processing unit;
  wherein when the first circuit detects user inactivity for a first duration, the second circuit compresses pixel data using a first algorithm,
  wherein when the first circuit detects user inactivity for the first duration, and compressed pixel data is stored in the internal memory, compressed pixel data is read from the internal memory and displayed,
  wherein when the first circuit detects user inactivity for the first duration, and compressed pixel data is stored in the external memory and not the internal memory, compressed pixel data is read from the external memory and displayed, and wherein when the first circuit detects user inactivity for a second duration, the second circuit compresses pixel data using a second algorithm.

6. The integrated circuit of claim 5 wherein the first algorithm is non-lossless.

7. The integrated circuit of claim 5 wherein the first algorithm is to truncate pixel data bits.

8. The integrated circuit of claim 5 wherein when the first circuit detects user activity within the first duration, the second circuit does not compress pixel data using the first algorithm.

9. The integrated circuit of claim 5 wherein the integrated circuit is an Integrated Graphics Processor.

10. A method of reducing power dissipation by compressing pixel data comprising:
with a graphics processor:
detecting a user's inactivity;
determining whether compressed pixel values are stored in an external memory; and if they are not stored in the external memory then
receiving a first plurality of pixel values from the external memory;
compressing the pixel values;
storing the compressed pixel values in the external memory; and if they are stored in the external memory then
determining whether compressed pixel values are stored in an internal memory on the graphics processor; and if they are not stored in the internal memory, then
receiving the compressed pixel values from the external memory;
further compressing the compressed pixel values
storing the further compressed pixel values in the internal memory; and
displaying the further compressed pixel values, and if they are stored in the internal memory, then
reading the compressed pixel values from the internal memory; and
displaying the compressed pixel values.

11. The method of claim 10 wherein the compressed pixel values comprise a plurality of lines of an image frame.

12. The method of claim 10 wherein the compressed pixel values comprise an image frame.

13. The method of claim 12 further comprising:
reducing a power supply for a central processing unit.

14. The method of claim 10 wherein the pixel values are compressed by truncating bits of the pixel values.

15. The method of claim 10 wherein the inactivity is detected by monitoring activity on one or more input devices.

16. The method of claim 10 wherein the external memory is a system memory.

17. The method of claim 16 wherein the graphics processing unit is located on an integrated graphics processor.

18. The method of claim 10 further comprising:
detecting activity by the user;
receiving a second plurality of pixel values from the external memory; and
displaying the second plurality of pixel values.

19. The method of claim 1 wherein the pixel values are compressed using a first algorithm and further compressed using a second algorithm.

20. The method of claim 10 wherein the pixel values are compressed using a first algorithm and further compressed using a second algorithm.

* * * * *